United States Patent [19]

Happel et al.

[11] Patent Number: 4,540,327
[45] Date of Patent: Sep. 10, 1985

[54] APPARATUS FOR FEEDING BULK MATERIAL, SUCH AS SAND

[75] Inventors: Friedrich Happel; Günter Heller, both of Baal, Fed. Rep. of Germany

[73] Assignee: F. Happel Tief-und Strassenbau GmbH, Baal, Fed. Rep. of Germany

[21] Appl. No.: 505,684

[22] Filed: Jun. 20, 1983

[30] Foreign Application Priority Data

Jul. 2, 1982 [DE] Fed. Rep. of Germany ....... 3224765

[51] Int. Cl.³ ............................................... B60P 1/42
[52] U.S. Cl. .................................... 414/352; 414/402; 414/501; 414/523; 405/179; 198/317
[58] Field of Search ............... 414/501, 503, 504, 505, 414/526, 352, 402, 523; 180/131; 198/317; 405/154, 157, 179

[56] References Cited

U.S. PATENT DOCUMENTS

| 3,446,026 | 5/1969 | Fikse | 405/129 |
| 3,558,015 | 1/1971 | Hardesty | 414/501 X |
| 3,638,816 | 2/1972 | Mann | 414/504 |
| 4,002,252 | 1/1977 | Beckman, Jr. | 414/501 |
| 4,298,084 | 11/1981 | Newell | 180/131 |

FOREIGN PATENT DOCUMENTS

| 566106 | 4/1958 | Belgium | 414/526 |
| 818948 | 7/1969 | Canada | 414/501 |
| 2470200 | 5/1981 | France | |
| 181688 | 4/1922 | United Kingdom | 414/526 |
| 849030 | 9/1960 | United Kingdom | 414/528 |

Primary Examiner—Robert J. Spar
Assistant Examiner—Ken Muncy
Attorney, Agent, or Firm—W. G. Fasse; D. H. Kane, Jr.

[57] ABSTRACT

A ditch, for example in the form of a cable or pipe channel, is uniformly filled with sand with the aid of a movable, funnel shaped container (1) for the sand, equipped with a conveyor feed screw (6) reaching from the container bottom to a container discharge member at an upper edge of the container. The discharge member includes a discharge opening in the upper container edge (5) below the upper end of the feed screw (6). A second conveyor in the form of a chute (7) is arranged to reach with its upper end to a point below the discharge opening when the chute is provided into its operating condition. The lower end of the chute reaches over the central area of a ditch (11). A guide member (8) at the lower end of the chute reaches into the ditch and slides or rolls along one ditch wall. Thus, the lower end of the chute which is able to swing or journal about a vertical axis, is maintained above the ditch even if the container on a carriage does not move exactly in parallel to the ditch.

6 Claims, 3 Drawing Figures

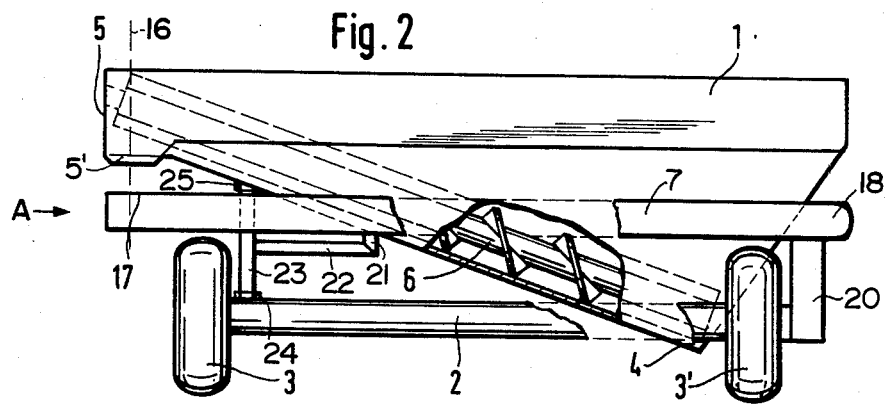
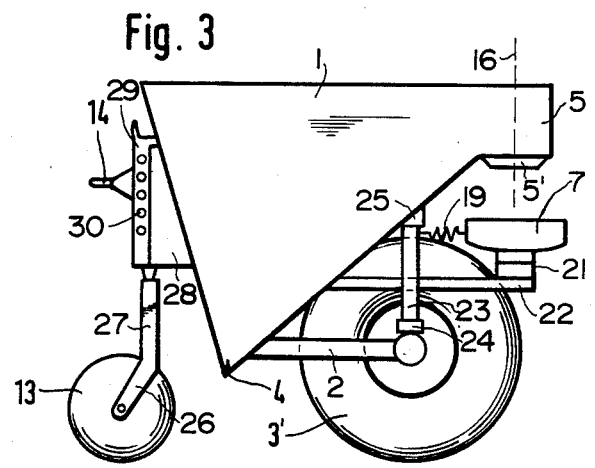

APPARATUS FOR FEEDING BULK MATERIAL, SUCH AS SAND

BACKGROUND OF THE INVENTION

The invention relates to an apparatus for feeding bulk material, such as sand, into a cable or conduit ditch.

In connection with the installation of cables and conduits in a ditch it is customary to protect the cables and conduits by first placing a layer of sand onto the bottom of the ditch. Thereafter, the cable and/or conduits are installed and subsequently a further layer of sand is placed onto the conduits and/or cables prior to the final filling of the ditch.

The placing of the cables and/or conduits in a body of sand protects these cables and/or conduits. However, in order to keep the installation or placing costs at an economically reasonable price, the use of sand is optimized by using just such a body of sand as is sufficient for achieving the desired protection. This aim requires to achieve a predetermined thickness of the body of sand in which the cables and/or conduits are embedded. Heretofore it was customary to manually distribute the sand in the ditch in order to achieve the desired thickness. Such manual sand distribution in a ditch is not only labor intensive, it also requires a substantial length of time and such manual labor requires a certain strength, especially due to the small space available in the narrow ditch which limits the movability of a person performing such work. In very narrow ditches a long handled shovel was necessary for this work so that a laborer could stand above the ditch and distribute the sand at the bottom of the ditch. Another disadvantage of the prior art manual sand distribution at the bottom of a narrow ditch is seen in that certain cables and conduits are rather sensitive to external damage. This applies, for example, to glass fiber cables which are very sensitive to breaking and thus could be damaged when the sand is distributed with a shovel. Thus, it was necessary heretofore to strictly make sure that nobody stepped on such a cable and that nobody damaged it. In fact, it was even necessary not to expose such cables to any excessive stress.

OBJECTS OF THE INVENTION

In view of the above it is the aim of the invention to achieve the following objects singly or in combination:

to provide an apparatus for the controlled filling of bulk material, especially sand, into a cable and/or conduit ditch;

such apparatus shall make it possible to place into the ditch over its entire length a layer of bulk material having a uniform thickness over the ditch length, whereby strength requiring, time consuming manual labor is to be avoided;

to minimize the dangers of damaging especially sensitive cables and conduits such as glass fiber cables;

to make the apparatus easily transportable, for example, as a trailer to be pulled by other construction equipment;

to construct the apparatus in such a way that it may travel alongside a dug ditch without necessarily remaining strictly in parallel thereto.

SUMMARY OF THE INVENTION

According to the invention the apparatus for feeding bulk material into a ditch is characterized by a funnel type container mounted on a movable carriage. The container holds the bulk material and a first conveyor, such as a screw conveyor, reaches from the funnel container bottom to a discharge edge of the container for moving the bulk material out of the container. A second conveyor is journalled for a tilting movement below the first container in such a way that its upper end registers with the discharge of the container when the second conveyor is in a working condition. The second conveyor may be a chute arranged on one side of the bulk material container.

The present apparatus is preferably constructed as a trailer which may be hitched to a dump truck with a tiltable loading space for refilling the container in a batch type manner. However, the discharge of sand with the aid of the first feed screw conveyor takes place continuously as a function of the travel motion of the funnel type container and proportionally to the speed of the pulling vehicle. The feed screw conveyor moves the bulk material to an also funnel shaped discharge or outlet near the container edge so that the bulk material may fall into the upper end of the second conveyor which leads into the open ditch. Thus, the first layer of sand may be easily placed on the bottom of the ditch when the apparatus travels along the ditch the first time. Thereafter, the cables and/or conduits are installed in the ditch and a second layer of sand is placed in the same manner. Both layers of sand will have the same desired uniform thickness throughout the ditch length and such thickness may easily be controlled by the speed with which the apparatus is travelling alongside the ditch. By installing the first conveyor screw so that it reaches all the way into the bottom of the funnel shaped container it is possible that the space of the container is altogether placed lower than the lowest level of the lower edge of the loading space of a dump truck. Preferably, the second conveyor is constructed as a trough type chute which is tiltable about at least one vertical axis, preferably near its upper end so that the discharge funnel edge of the container and the upper end of the chute will register when the chute is in its operating position.

BRIEF FIGURE DESCRIPTION

In order that the invention may be clearly understood, it will now be described, by way of example, with reference to the accompanying drawings, wherein:

FIG. 2 is a view similar to that of FIG. 1 showing the second conveyor in the form of a chute in its rest position and illustrating a modified journalling or pivoting support for the chute; and FIG. 3 is a side view in the direction of the arrow A in FIG. 2 with one wheel omitted so as to show the pivoting means for the chute.

Figure 1:
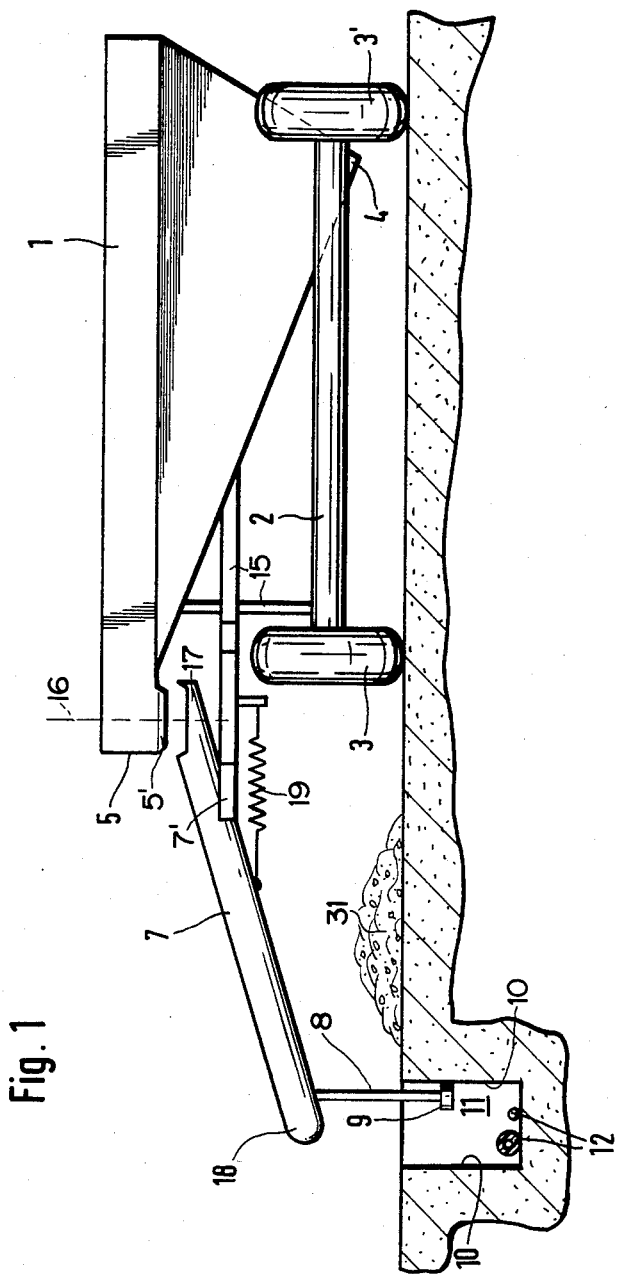
FIG. 1 is a rear view of the present apparatus with the second conveyor in its operating position for movement alongside a ditch, whereby the direction of movement is perpendicularly into the plane of FIG. 1.

DETAILED DESCRIPTION OF PREFERRED EXAMPLE EMBODIMENTS AND OF THE BEST MODE OF THE INVENTION

FIG. 1 shows a rear view of the present sand placing apparatus comprising a funnel shaped container 1 which is open at the top and mounted on a carriage 2 forming a trailer type vehicle with a left wheel 3 and a right wheel 3'. The funnel shaped container 1 is so shaped and positioned on the carriage 2 that its largest proportion is located in front of the wheels 3,3' and that the elevated part of the container 1 is located above the wheels as best seen in FIG. 3, in which the travel direction is from right to left.

In FIG. 1 the sand is moved into a ditch 11 having installed therein cables and/or conduits 12 and provided with substantially vertical ditch walls 10. For this purpose a first conveyor means, such as a feed screw 6 shown in FIG. 2 is installed in the container 1 for moving the bulk material from the bottom 4 of the container 1 to a discharge edge 5 provided with a downwardly open discharge or outlet funnel 5' so that the bulk material may fall by gravity onto the upper end of a second conveyor such as a chute 7 along which the sand travels downwardly by gravity into the ditch 11. The drive for the feed screw 6 is preferably derived from one of the wheels 3,3'. The chute 7 is journalled to a journal member 7' which in turn is mounted to the carriage or container by support rods or brackets 15. Preferably, the journal or pivot member 7' is arranged with its vertical pivot axis to coincide with a vertical axis 16 extending substantially centrally through the discharge funnel 5'. This vertical alignment of the journal axis or pivot axis of the journal or pivot member 7' with the vertical axis 16 has the advantage that the upper end 17 of the chute 7 is aligned with the discharge funnel 5' in all positions of the chute 7. However, it is not entirely necessary to align the pivot or journal axis with the vertical axis 16 because it is sufficient when the upper chute end 17 is aligned with the discharge funnel 5' at the time when the chute 7 is in its sand discharging position as shown in FIG. 1.

In the position of the chute 7 in FIG. 1 the lower end 18 of the chute is substantially located above the ditch 11 and a guide member 8, preferably provided with a roller 9 at its lower end, makes sure that the lower end 18 will always discharge the sand into the ditch 11 even if the carriage 2 does not strictly move in parallel to the length of the ditch 11. The roller 9 is rotatable about a vertical axis and contacts one side wall 10 of the ditch to provide the required guide for the lower end 18 of the chute 7.

A tension spring 19 is operatively arranged between the chute 7 and a fixed point on the carriage or container or bracket to impart on the chute 7 a tendency to fold back into the transport condition shown in FIGS. 2 and 3. Simultaneously the spring 19 urges the guide roller 9 against the respective side wall 10 of the ditch.

In FIG. 2 the chute 7 is shown in its rest position, whereby the free end 18 of the chute 7 is supported on a bracket 20 secured to the carriage. In the embodiment of FIG. 2 the pivoting means for the chute 7 differ somewhat from the journal or pivot support shown in FIG. 1 because in FIG. 2 the chute 7 is supported by a first pivot member 21 which is secured by an arm 22 to a vertical journal shaft 23 held in journal bearings 24 and 25. Thus, the chute 7 in FIGS. 2 and 3 is pivotable about a vertical axis extending through the pivot member 21 which in turn is pivotal about the vertical axis defined by the journal shaft 23. This increases the movability of the chute 7 while still providing a possibility for aligning the left or upper end 17 of the chute 7 with the discharge funnel 5' in the working condition or position of the chute 7 so that the upper end 17 registers vertically below 5'.

As mentioned above, the action of the spring 19 in cooperation with the guide means 8, 9 makes sure that the free end 18 of the chute 7 is substantially always aligned with the center of the ditch 11 even if the trailer does not move exactly in parallel to the length of the ditch. Further, the components are so arranged relative to each other that the movement of the chute 7 between its working condition shown in FIG. 1 and its transport condition shown in FIGS. 2 and 3 does not interfere with the wheels or any other part of the apparatus.

FIG. 3 shows a support wheel 13 mounted for rotation in the fork 26 of a vertically extending post 27 which is rotatable about a vertical axis relative to a bracket 28 carrying hitching means 29 to which a hitching eye bolt 14 is attachable at several selectable elevations as indicated by the holes 30 in the hitching means 29. A conventional three point hitch may also be suitable for the purpose of coupling the present apparatus to a pulling vehicle such as a dump truck for periodically refilling the container 1 while continuously discharging the sand through the chute 7 as long as the pulling vehicle pulls the trailer shown in FIG. 3 along a ditch.

From FIG. 1 it is apparent that the chute 7 conveniently reaches across the material 31 piled up alongside the ditch when the ditch was dug. Such material 31 is normally piled up on the side most easily accessible and therefore it is an advantage of the invention that the chute can reach over such material without interfering with the travel of the apparatus alongside the ditch. Another advantage of the tiltable chute 7 is seen in that it can be placed entirely within the confines of the container 1 when the chute is not in use so that travelling along public roads is possible.

Further, the fact that the angle between the longitudinal axis of the chute 7 and the travel direction of the apparatus may be varied by the spring 19, the arrangement has the advantage that the lower end 18 will remain aligned substantially above the center of the ditch regardless whether the apparatus travels exactly in parallel to the ditch or not. This feature is achieved because the function of the spring 19 cooperates with the guide element 8, 9. The same function can be achieved, however, even without the guide elements 8 and 9 if an operator manually guides the lower end 18 of the chute 7. While the roller 9 is preferable, because with its rotation about a vertical axis, it will guide the lower end of the chute even if the sidewalls 10 of the ditch are uneven, it is not absolutley necessary to provide the guide roller 9. A downwardly reaching rod 8 will also provide a sufficient guidance, especially where the ditch sidewalls 10 are fairly even, for example, in hard ground. The guide rod 8 and/or the guide rod 8 and the roller 9 will be so attached to the lower end 18 of the chute 7 that the end 18 is substantially centered above the center of the ditch.

By providing a hitch which is elevationally adjustable, it is possible to connect the hitching bolt to pulling vehicles of different sizes, while still assuring the periodic refilling.

Thus, it is also possible to adjust the top edge of the container 1 so that its elevation will be at least slightly below the elevation of the loading floor of the dump truck.

Although the invention has been described with reference to specific example embodiments, it will be appreciated that it is intended to cover all modifications and equivalents within the scope of the appended claims.

What is claimed is:

1. An apparatus for feeding bulk material into a ditch comprising carriage means (2, 3) continuously movable in a travel direction along the ditch, funnel shaped container means (1) operatively supported by said carriage means for holding a supply of bulk material, said container means having a discharge member (5) at an upper edge of said container means, first feed conveyor means (6) operatively mounted in said funnel shaped container means for transporting bulk material from the bottom of the container means to said discharge member, elongated second conveyor means (7) having an upper end and a lower end, journal means for hinging said second conveyor means (7) about a vertical axis so that said second conveyor means receive at said upper end of the second conveyor means bulk material from said first feed conveyor means when the second conveyor means is in a working position extending normally substantially at a right angle to said travel direction for discharging bulk material into the ditch in said working position of said second conveyor means and for folding the second conveyor means into an inactive position, said apparatus further comprising tension spring means (19) connected with one spring end to said elongated second conveyor means and with its opposite spring end to a fixed point on said apparatus for urging said elongated second conveyor means toward said apparatus, guide means (8) operatively secured to said lower end of said elongated second conveyor means (7) for reaching into said ditch, roller means (9) operatively connected to said guide means reaching into said ditch, said tension spring means cooperating with said guide means for urging said roller means against a wall of said ditch for keeping said lower end of said second conveyor means in alignment with said ditch even when said apparatus is not travelling exactly in parallel to said ditch.

2. The apparatus of claim 1, wherein said second conveyor means is a chute, and wherein said journal means having a vertical axis are arranged near the upper end of said chute.

3. The apparatus of claim 1, wherein said tension spring means also urge said elongated second conveyor means (7) out of said working position extending substantially at right angles to said travel direction of said carriage means, into a folded back position.

4. The apparatus of claim 3, wherein said tension spring means extends at an acute angle relative to said second conveyor means (7).

5. The apparatus of claim 1, further comprising hitching means (14) including vertically adjustable means, operatively connected to said carriage means for coupling the carriage means to a traction vehicle.

6. The apparatus of claim 1, wherein said first feed conveyor means comprise a conveyor feed screw (6).

* * * * *

UNITED STATES PATENT AND TRADEMARK OFFICE
CERTIFICATE OF CORRECTION

PATENT NO. : 4,540,327
DATED : September 10, 1985
INVENTOR(S) : Friedrich Happel, Guenter Heller It is certified that error appears in the above—identified patent and that said Letters Patent is hereby corrected as shown below:

In the Abstract: [57] line 11, replace "provided" by --pivoted--

Signed and Sealed this

Seventeenth Day of December 1985

[SEAL]

Attest:

DONALD J. QUIGG

Attesting Officer

Commissioner of Patents and Trademarks